(12) United States Patent
Nagata et al.

(10) Patent No.: US 11,794,846 B2
(45) Date of Patent: Oct. 24, 2023

(54) LEANING VEHICLE

(71) Applicant: YAMAHA HATSUDOKI KABUSHIKI KAISHA, Iwata (JP)

(72) Inventors: Tatsuya Nagata, Shizuoka (JP); Toshifumi Uchiyama, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 65 days.

(21) Appl. No.: 17/684,148

(22) Filed: Mar. 1, 2022

(65) Prior Publication Data

US 2022/0185415 A1  Jun. 16, 2022

Related U.S. Application Data

(63) Continuation-in-part of application No. PCT/JP2020/033277, filed on Sep. 2, 2020.

(30) Foreign Application Priority Data

Sep. 2, 2019 (JP) ................ 2019-159342

(51) Int. Cl.
  *B62K 5/10*  (2013.01)
  *B62K 5/027*  (2013.01)

(52) U.S. Cl.
  CPC .............. *B62K 5/10* (2013.01); *B62K 5/027* (2013.01)

(58) Field of Classification Search
  CPC .......... B62K 5/10; B62K 5/027; B62K 28/04; B62K 28/10; B60G 2300/45; B60G 17/0162; B62H 1/02
  USPC ................................. 280/124.103
  See application file for complete search history.

(56) References Cited

U.S. PATENT DOCUMENTS

| | | | | |
|---|---|---|---|---|
| 6,224,069 | B1 * | 5/2001 | Chan ............... | B60G 17/0155 280/124.16 |
| 2005/0278093 | A1 * | 12/2005 | Kameyama ......... | B60R 16/0373 701/49 |
| 2018/0257728 | A1 | 9/2018 | Kanehara et al. | |
| 2019/0135068 | A1 | 5/2019 | Krnja et al. | |

FOREIGN PATENT DOCUMENTS

| | | |
|---|---|---|
| DE | 3711554 A1 | 10/1988 |
| EP | 1142779 A2 | 10/2001 |
| EP | 2767464 A1 | 8/2014 |
| EP | 3363724 A1 | 8/2018 |

(Continued)

*Primary Examiner* — Paul N Dickson
*Assistant Examiner* — Tiffany L Webb
(74) *Attorney, Agent, or Firm* — Rabin & Berdo, P.C.

(57) ABSTRACT

A leaning vehicle including a vehicle body, front and rear wheels, a leaning mechanism that causes the vehicle body and the front and rear wheels to lean left or right when the leaning vehicle turns left or right, a lean actuator, a support stand, a detection device that detects a getting on intention input and or a getting off intention input, which respectively indicate that a rider of the leaning vehicle intends to get on and off the leaning vehicle, and a control device configured to control the lean actuator to thereby control a lean angle of the vehicle body while the vehicle body is in motion, based on a manipulation that the rider performs for turning in the left or right direction, and control the lean angle of the vehicle body while the leaning vehicle is not in motion, based on a detection result of the detection device.

7 Claims, 5 Drawing Sheets

(56) References Cited

FOREIGN PATENT DOCUMENTS

| | | |
|---|---|---|
| JP | H05-92788 A | 4/1993 |
| JP | 2011201504 A | 10/2011 |
| JP | 2012081784 A | 4/2012 |
| JP | 2013-144513 A | 7/2013 |
| JP | 2017095088 A | 6/2017 |
| JP | 1595205 S | 1/2018 |
| JP | 2019-031149 A | 2/2019 |
| JP | 2019064535 A | 4/2019 |
| WO | 2017/082426 A1 | 5/2017 |
| WO | 2017/086352 A1 | 5/2017 |

* cited by examiner

FIG.1

WHEN PASSENGER GETS OFF

WHEN PASSENGER GETS ON

WHEN PASSENGER GETS OFF

WHEN PASSENGER GETS ON

FIG.5

WHEN PASSENGER GETS OFF

WHEN PASSENGER GETS ON

LEANING VEHICLE

CROSS-REFERENCE TO RELATED APPLICATIONS

This is a continuation-in-part application of International Application PCT/JP2020/033277, filed on Sep. 2, 2020, which claims priority from Japanese Patent Application No. 2019-159342, filed on Sep. 2, 2019. The contents of the applications are incorporated herein by reference.

TECHNICAL FIELD

The present teaching relates to a leaning vehicle, and more specifically relates to a leaning vehicle including a lean actuator for leaning a vehicle body.

BACKGROUND ART

Conventionally known is a leaning vehicle including a lean actuator for leaning a vehicle body. A leaning vehicle of this type is disclosed for example, in WO2017/86352.

Some of the known leaning vehicles including the lean actuators for leaning the vehicle bodies are leaning vehicles including vehicle bodies with roofs. A leaning vehicle of this type is disclosed for example, in Japanese Design Registration No. 1595205.

CITATION LIST

Patent Literature

PTL 1: WO2017/86352
PTL 2: Japanese Design Registration No. 1595205

SUMMARY OF INVENTION

Technical Problem

The present teaching aims to provide a leaning vehicle including a lean actuator for leaning a vehicle body, the leaning vehicle being capable of increasing the degree of freedom in design of the vehicle body.

Solution to the Problem

Of leaning vehicles including lean actuators for leaning vehicle bodies, some have no roofs on their vehicle bodies like the one shown in PTL 1 above, and others have roofs on their vehicle bodies like the one shown in PTL 2 above. It is desired that variations of the vehicle bodies be increased in the leaning vehicles including the lean actuators for leaning the vehicle bodies. For example, increasing the degree of freedom in design of the vehicle bodies is one conceivable method for increasing variations of the vehicle bodies.

The inventors of the present application conducted studies on a leaning vehicle including a lean actuator for leaning a vehicle body, from the viewpoint of increasing the degree of freedom in design of the vehicle body. The studies resulted in a discovery that the lean actuator for leaning the vehicle body may be used not only while the leaning vehicle is traveling but also when a rider gets on or gets off the vehicle. This allows the same actuator to be used both while the leaning vehicle is traveling and when the rider gets on or gets off the vehicle. Therefore an actuator, for use when the rider gets on or gets off the vehicle, which is separately provided in addition to the lean actuator for leaning the vehicle body while the leaning vehicle is traveling, is not necessary. This eliminates the need to prepare a space for installation of the additional actuator. Consequently, the degree of freedom in design of the vehicle body can be increased. Based on the knowledge newly obtained in this manner, the present teaching has been accomplished.

A leaning vehicle according to an embodiment of the present teaching includes: a vehicle body; one or two front wheels supported by the vehicle body; a rear wheel supported by the vehicle body, the rear wheel comprising two rear wheels when the number of the front wheels is one, the rear wheel comprising one or two rear wheels when the number of the front wheels is two; a leaning mechanism that causes the vehicle body, the front wheels, and the rear wheels to lean in a left direction when the leaning vehicle turns in the left direction, and causes the vehicle body, the front wheels, and the rear wheels to lean in a right direction when the leaning vehicle turns in the right direction; a lean actuator connected to the leaning mechanism, the lean actuator being configured to impart a force to a leaning operation of the vehicle body, the front wheels, and the rear wheels; and a control device that controls the lean actuator so as to control a lean angle of the vehicle body while traveling, based on a manipulation that a rider performs for turning in the left direction or the right direction. The leaning vehicle further includes a detection device that detects a getting on/getting off intention input indicating an intention of the rider to get on or get off the leaning vehicle. The control device controls the lean actuator so as to control the lean angle of the vehicle body while the leaning vehicle is not in motion, based on the detection device detecting the getting on/getting off intention input indicating an intention of the rider to get on or get off the leaning vehicle.

In the foregoing leaning vehicle, the lean angle of the vehicle body can be controlled by the lean actuator both while the vehicle is traveling and while the vehicle is not in motion. It therefore is not necessary that an actuator separate from the lean actuator is used as an actuator for controlling the lean angle of the vehicle body while the vehicle is not in motion. This eliminates the need to prepare a space for installation of the actuator. Consequently, the degree of freedom in design of the vehicle body can be increased.

The leaning vehicle according to the embodiment of the present teaching may include a roof that is at least partially disposed above the rider of the leaning vehicle, for example. The leaning vehicle including such a roof may be provided with a door that is opened or closed when the rider of the leaning vehicle gets on or gets off the vehicle.

In the embodiment of the present teaching, the vehicle body includes a vehicle body frame. The vehicle body frame may be a frame composed of a combination of two or more parts, or may be a frame composed of two or more parts being integrally molded. A material of the vehicle body frame may be a metal such as aluminum or iron, may be a synthetic resin such as a CFRP, or may be a combination of them. The vehicle body frame may have a monocoque structure constituted by an exterior part of the leaning vehicle, or may have a semimonocoque structure that partially serves as an exterior part of the leaning vehicle.

In the embodiment of the present teaching, the one or two front wheels are supported by the vehicle body so as to be swingable about an axis extending in an up-down direction of the vehicle body, for example. The axis extending in the up-down direction of the vehicle body may not always need to extend in the vertical direction while the vehicle body is upright. The axis extending in the up-down direction of the vehicle body may be inclined toward the rear of the vehicle body relative to the vertical direction while the vehicle body is upright, for example. In other words, the upper end of the axis extending in the up-down direction of the vehicle body may be positioned more rearward than the lower end of the axis extending in the up-down direction of the vehicle body, while the vehicle body is upright.

In the embodiment of the present teaching, the front wheels may be directly supported by the vehicle body, or may be indirectly supported by the vehicle body, for example. An aspect in which the front wheels are indirectly supported by the vehicle body encompasses an aspect of using a suspension device for supporting the front wheels on the vehicle body, the suspension device being disposed between the front wheels and the vehicle body, for example. A suspension device for supporting one front wheel on the vehicle body is a front fork of telescopic type or of bottom link type, for example. A suspension device for supporting two front wheels on the vehicle body is a suspension of independent suspension type, for example. The two front wheels are arranged side by side in a left-right direction of the leaning vehicle, for example.

In the embodiment of the present teaching, the rear wheel may be directly supported by the vehicle body, or may be indirectly supported by the vehicle body, for example. An aspect in which the rear wheel is indirectly supported by the vehicle body encompasses an aspect of using a suspension device for supporting the rear wheel on the vehicle body, the suspension device being disposed between the rear wheel and the vehicle body, for example. A suspension device for supporting one rear wheel on the vehicle body is a suspension of swing arm type, for example. A suspension device for supporting two rear wheels on the vehicle body is a suspension of independent suspension type, for example. The two rear wheels are arranged side by side in the left-right direction of the leaning vehicle, for example.

In the embodiment of the present teaching, the leaning mechanism includes a link mechanism capable of being deformed by receiving a force from the lean actuator, for example. Such a link mechanism includes a lean mechanism that adopts a parallelogram link system as a lean mechanism for leaning the two front wheels, for example. An aspect in which the leaning mechanism causes the vehicle body, the front wheels, and the rear wheels to lean in the left direction or the right direction encompasses an aspect in which the leaning mechanism causes any of the vehicle body, the front wheels, or the rear wheels to lean in the left direction or the right direction, and accordingly the rest of them leans in the left direction or the right direction.

In the embodiment of the present teaching, the lean actuator includes an output member that is mechanically connected to the leaning mechanism, for example. An aspect in which the output member is mechanically connected to the leaning mechanism encompasses an aspect in which power transmission from the output member to the leaning mechanism is allowed, for example. The lean actuator is, for example, an electric motor having an output member capable of rotating in a clockwise and a counter-clockwise. The lean actuator may be directly connected to the leaning mechanism, or may be indirectly connected to the leaning mechanism. An aspect in which the lean actuator imparts a force to the leaning operation of the vehicle body, the front wheels, and the rear wheels encompasses an aspect in which the link mechanism included in the leaning mechanism is deformed by a force from the lean actuator, for example. The aspect in which the lean actuator imparts a force to the leaning operation of the vehicle body, the front wheels, and the rear wheels encompasses an aspect in which the lean actuator imparts a force to cause any of the vehicle body, the front wheels, or the rear wheels to lean, and accordingly the rest of them leans.

In the leaning vehicle according to the embodiment of the present teaching, the control device is an ECU (Electric Control Unit), for example. The ECU is implemented by, for example, a combination of an IC (Integrated Circuit), an electronic component, a circuit board, and the like. A control performed by the control device is implemented by, for example, a CPU (Central Processing Unit) reading out a program stored in a non-volatile memory and executing a predetermined process in accordance with the program.

In the embodiment of the present teaching, the manipulation that the rider performs for turning in the left direction or the right direction is implemented with use of manipulation means that is provided in the vehicle body in such a manner that the manipulation means can be manipulated by the rider, for example. Examples of the manipulation means include a handlebar capable of being manipulated and swung by the rider.

In the embodiment of the present teaching, an aspect of controlling the lean actuator so as to control the lean angle of the vehicle body while the vehicle is traveling encompasses an aspect of, when a manipulation for turning in the left direction is performed by the rider, controlling the lean actuator so as to cause the vehicle body to lean in the left direction while the vehicle is traveling, and when a manipulation for turning in the right direction is performed by the rider, controlling the lean actuator so as to cause the vehicle body to lean in the right direction while the vehicle is traveling, for example. The lean angle of the vehicle body while the vehicle is traveling varies in accordance with the manipulation that the rider performs for turning in the left direction or the right direction, for example. The lean angle becomes greater as the amount of manipulation increases, for example.

In the embodiment of the present teaching, for example, the lean angle of the vehicle body is obtained on the basis of, as a reference, a state where the vehicle body is upright on a road surface, and is an angle obtained when the vehicle body is inclined in the left direction or the right direction relative to the state where the vehicle body is upright on the road surface. For example, provided that a straight line extending in the up-down direction of the vehicle body while the vehicle body is upright on a road surface is defined as a reference line, the lean angle of the vehicle body is an angle formed between the reference line and a straight line extending in the up-down direction of the vehicle body when the vehicle body is inclined in the left direction or the right direction relative to the state where the vehicle body is upright on the road surface.

In the embodiment of the present teaching, an aspect in which the control device controls the lean actuator so as to control the lean angle of the vehicle body while the vehicle is not in motion encompasses: an aspect in which the control device controls the lean actuator so as to change the lean angle of the vehicle body while the vehicle is not in motion; and an aspect in which the control device controls the lean actuator so as not to change the lean angle of the vehicle body while the vehicle is not in motion. The lean angle of the vehicle body while the vehicle is not in motion may be controlled before the rider gets on the vehicle, may be controlled after the rider gets on the vehicle, may be controlled before the rider gets off the vehicle (while the rider is aboard the vehicle), or may be controlled after the rider gets off the vehicle.

In the embodiment of the present teaching, the detection of the getting on/getting off intention input by the detection device is not particularly limited. The detection of the getting on/getting off intention input by the detection device includes a biometric authentication, for example. The biometric authentication is not particularly limited, as long as it is performed by using physical and/or behavioral characteristics of the rider of the leaning vehicle. The biometric authentication may be performed while the rider of the leaning vehicle is in contact with the leaning vehicle, or may be performed while the potential rider of the leaning vehicle is located away from the leaning vehicle. Examples of the biometric authentication include a face authentication, a voice authentication (voiceprint authentication), a fingerprint authentication, a vein authentication, an iris authentication, a retina authentication, a gesture authentication, and the like.

In the embodiment of the present teaching, the detection of the getting on/getting off intention input by the detection device may be performed before the rider gets on the leaning vehicle, or may be performed while the rider is aboard the leaning vehicle. In a case where the detection of the getting on/getting off intention input by the detection device is performed before the rider gets on the leaning vehicle, the detection of the getting on/getting off intention input by the detection device may be performed while the rider is in contact with the leaning vehicle, or may be performed while the potential rider is located away from the leaning vehicle.

In the embodiment of the present teaching, the detection of the getting on/getting off intention input by the detection device may be performed while the potential rider is located away from the leaning vehicle, or may be performed while the rider is in contact with the leaning vehicle. A getting on/getting off intention input that the detection device detects while the potential rider is located away from the leaning vehicle is one indicating an intention of the rider to get on the vehicle, for example. A getting on/getting off intention input that the detection device detects while the rider is in contact with the leaning vehicle may be one indicating an intention of the rider to get on the vehicle, or may be one indicating an intention of the rider to get off the vehicle. The state where the rider is in contact with the leaning vehicle encompasses a state where the rider is aboard the leaning vehicle and a state where the rider is not aboard the leaning vehicle but is in contact with a member (or a component) included in the leaning vehicle.

In the embodiment of the present teaching, an aspect in which the detection device detects a getting on/getting off intention input is not particularly limited. An aspect in which the detection device detects a getting on/getting off intention input indicating an intention of the rider to get on the vehicle may be the same as an aspect in which the detection device detects a getting on/getting off intention input indicating an intention of the rider to get off the vehicle, or may be different from the aspect in which the detection device detects a getting on/getting off intention input indicating an intention of the rider to get off the vehicle. When the aspect in which the detection device detects a getting on/getting off intention input indicating an intention of the rider to get on the vehicle is different from the aspect in which the detection device detects a getting on/getting off intention input indicating an intention of the rider to get off the vehicle, the detection device may include a first detection device and a second detection device, the first detection device being configured to detect a getting on/getting off intention input indicating an intention of the rider to get on the vehicle, the second detection device being configured to detect a getting on/getting off intention input indicating an intention of the rider to get off the vehicle.

In the embodiment of the present teaching, the getting on/getting off intention input may be performed by using a portable device carried by the rider of the leaning vehicle, or may be performed by using a device disposed in the leaning vehicle. An aspect in which the rider carries the device encompasses not only an aspect in which the rider carries the device by holding it with his/her hand but also an aspect in which the rider carries the device by wearing it on his/her body. Examples of the portable device that can be carried by the rider include a smart key, a smart phone, a smart watch, and a smart glass. In a case of using a smart key, the rider may manipulate the smart key, or the potential rider having the smart key may approach the leaning vehicle. In a case of the rider manipulating the smart key, the rider manipulates a button of the smart key, for example. The button of the smart key may be a physical one, or may be an electrically-generated one. In a case of using a smart phone, a dedicated application is used, for example. In a case of using a smart watch or a smart glass, the potential rider wearing the smart watch or the smart glass may approach the leaning vehicle, for example. When the rider having the smart key (or wearing the smart watch or the smart glass) approaches the leaning vehicle, the detection device may measure the distance from the detection device to the smart key (or to the smart watch or the smart glass). In this case, detection of a getting on/getting off intention input by the detection device may be conditional on the smart key (or the smart watch or the smart glass) being present within a first distance that is set in advance as a distance indicating that the rider has an intention to get on the vehicle. The device disposed in the leaning vehicle may be used exclusively for a getting on/getting off intention input, or may be a device that is used for implementing a function of the leaning vehicle.

In the embodiment of the present teaching, the intention of the rider to get on the vehicle may be an intention of the rider to perform a getting on movement whereby the rider gets on the leaning vehicle. The intention of the rider to get on the vehicle may be an intention of the rider to perform a series of getting on steps from the step of getting on the vehicle to the step of starting the leaning vehicle. In other words, the intention of the rider to get on the vehicle is just required to include an intention of the rider to perform a getting on movement whereby the rider gets on the leaning vehicle. The intention of the rider to get on the vehicle may include not only an intention of the rider to perform a getting on movement whereby the rider gets on the leaning vehicle but also an intention to start the leaning vehicle. The intention of the rider to get off the vehicle may be an intention of the rider to perform a getting off movement whereby the rider gets off the leaning vehicle. The intention of the rider to get off the vehicle may be an intention of the rider to perform a series of getting off steps from the step of getting off the vehicle to the step of parking the leaning vehicle. In other words, the intention of the rider to get off the vehicle is just required to include an intention of the rider to perform a getting off movement whereby the rider gets off the leaning vehicle. The intention of the rider to get off the vehicle may include not only an intention of the rider to perform a getting off movement whereby the rider gets off the leaning vehicle but also an intention to park the leaning vehicle.

In the embodiment of the present teaching, the detection device and the control device may be connected by wire, or may be connected wirelessly.

In the leaning vehicle according to the embodiment of the present teaching, it is preferable that the detection device detects the getting on/getting off intention input from the rider who is a potential rider located away from the leaning vehicle.

In the leaning vehicle according to the embodiment of the present teaching, it is preferable that the getting on/getting off intention input detected by the detection device includes at least one of an image, a voice, a radio wave or a sound wave. In a case where the getting on/getting off intention input is an image, the detection device includes an image pickup device. In a case where the getting on/getting off intention input is a voice, the detection device includes a microphone. In a case where the getting on/getting off intention input is a radio wave or a sound wave, the detection device includes a receiver. Preferably, the leaning vehicle according to the embodiment of the present teaching further includes a getting on/getting off intention input device. The getting on/getting off intention input device is disposed at such a position that the rider can manipulate the getting on/getting off intention input device. The getting on/getting off intention input device receives a getting on/getting off intention input indicating an intention of the rider to get on or get off the vehicle. The detection device detects the getting on/getting off intention input that the rider enters to the getting on/getting off intention input device.

In the embodiment of the present teaching, the getting on/getting off intention input device may be used exclusively for receiving a getting on/getting off intention input, or may be a device that is used for implementing a function of the leaning vehicle. The device that is used for implementing a function of the leaning vehicle may be a main switch (more specifically, a portion to be manipulated by the rider) used to start the leaning vehicle, may be a support stand used in parking the leaning vehicle, or may be a seat on which the rider sits while being aboard the vehicle, for example. In a case where the getting on/getting off intention input device is a support stand, for example, the detection device may include a switch for detecting a state of the support stand. In a case where the getting on/getting off intention input device is displaced or deformed upon reception of a getting on/getting off intention input, for example, the detection device may detect the getting on/getting off intention input by detecting the deformation or displacement of the getting on/getting off intention input device. The getting on/getting off intention input device may include a detection device.

In the leaning vehicle according to the embodiment of the present teaching, the control device may control the lean actuator so as to control the lean angle of the vehicle body while the vehicle is not in motion, in the following aspect (1) or (2):

(1) after the detection device detects the getting on/getting off intention input, the lean actuator controls the lean angle of the vehicle body, and then, the rider gets on or gets off the leaning vehicle; or (2) after the detection device detects the getting on/getting off intention input, the rider gets on or gets off the vehicle, and then, the lean actuator controls the lean angle of the leaning vehicle body.

The aspect (1) encompasses an aspect in which after the detection device detects the getting on/getting off intention input, the lean actuator controls the lean angle of the vehicle body, and then, the rider gets on the vehicle. The aspect (1) encompasses an aspect in which after the detection device detects the getting on/getting off intention input, the lean actuator controls the lean angle of the vehicle body, and then, the rider gets off the vehicle. The aspect (2) encompasses an aspect in which after the detection device detects the getting on/getting off intention input, the rider gets on the vehicle, and then, the lean actuator controls the lean angle of the vehicle body. The aspect (2) encompasses an aspect in which after the detection device detects the getting on/getting off intention input, the rider gets off the vehicle, and then, the lean actuator controls the lean angle of the vehicle body. When, in the aspect (2), the detection device detects the getting on/getting off intention input that the rider enters to the getting on/getting off intention input device, the detection of the getting on/getting off intention input by the detection device may be effectuated by the rider getting on or off the vehicle. In other words, the detection of the getting on/getting off intention input by the detection device may be upon the rider getting on or off the vehicle. That is, the aspect (2) encompasses an aspect in which the detection of the getting on/getting off intention input by the detection device is effectuated by the rider getting on the vehicle, and then, the lean actuator controls the lean angle of the vehicle body. The aspect (2) encompasses an aspect in which the detection of the getting on/getting off intention input by the detection device is effectuated by the rider getting off the vehicle, and then, the lean actuator controls the lean angle of the vehicle body. In the aspect (1), an aspect in which the lean actuator controls the lean angle of the vehicle body encompasses an aspect in which the lean actuator changes the lean angle of the vehicle body. In the aspect (1), the aspect in which the lean actuator controls the lean angle of the vehicle body encompasses an aspect in which the lean actuator maintains the lean angle of the vehicle body. In the aspect (2), an aspect in which the lean actuator controls the lean angle of the vehicle body encompasses an aspect in which the lean actuator changes the lean angle of the vehicle body. In the aspect (2), the aspect in which the lean actuator controls the lean angle of the vehicle body encompasses an aspect in which the lean actuator maintains the lean angle of the vehicle body.

In the aspect in which after the detection device detects the getting on/getting off intention input, the lean actuator controls the lean angle of the vehicle body, and then, the rider gets on the vehicle; the intention of the rider to get on the vehicle is just required to be an intention of the rider to perform a getting on movement whereby the rider gets on the leaning vehicle. In the aspect in which after the detection device detects the getting on/getting off intention input, the lean actuator controls the lean angle of the vehicle body, and then, the rider gets on the vehicle; the intention of the rider to get on the vehicle is just required to include an intention of the rider to perform a getting on movement whereby the rider gets on the leaning vehicle. In the aspect in which after the detection device detects the getting on/getting off intention input, the lean actuator controls the lean angle of the vehicle body, and then, the rider get off the vehicle; the intention of the rider to get off the vehicle is just required to be an intention of the rider to perform a getting off movement whereby the rider gets off the leaning vehicle. In the aspect in which after the detection device detects the getting on/getting off intention input, the lean actuator controls the lean angle of the vehicle body, and then, the rider get off the vehicle; the intention of the rider to get off the vehicle is just required to include an intention of the rider to perform a getting off movement whereby the rider gets off the leaning vehicle. In the aspect in which after the detection device detects the getting on/getting off intention input, the rider gets on the vehicle, and then, the lean actuator controls the lean angle of the vehicle body; the intention of the rider to get on the vehicle is just required to be an intention of the rider to perform a series of getting on steps from the step of getting on the vehicle to the step of starting the leaning vehicle. In the aspect in which after the detection device detects the getting on/getting off intention input, the rider gets off the vehicle, and then, the lean actuator controls the lean angle of the vehicle body; the intention of the rider to get off the vehicle is just required to be an intention of the rider to perform a series of getting off steps from the step of getting off the vehicle to the step of parking the leaning vehicle. In the aspect in which the detection of the getting on/getting off intention input by the detection device is effectuated by the rider getting on the vehicle, and then, the lean actuator controls the lean angle of the vehicle body; the intention of the rider to get on the vehicle is just required to be an intention of the rider to perform a series of getting on steps from the step of getting on the vehicle to the step of starting the leaning vehicle. In the aspect in which the detection of the getting on/getting off intention input by the detection device is effectuated by the rider getting off the vehicle, and then, the lean actuator controls the lean angle of the vehicle body; the intention of the rider to get off the vehicle is just required to be an intention of the rider to perform a series of getting off steps from the step of getting off the vehicle to the step of parking the leaning vehicle.

These and other objects, features, aspects and advantages of the present teaching will become apparent from the following detailed description, which, taken in conjunction with the accompanying drawings, discloses some embodiments of the present teaching. As used herein, the term "and/or" includes any and all combinations of one or more of the associated listed items. As used herein, the terms "including", "comprising", or "having", and variations thereof specify the presence of stated features, steps, operations, elements, components, and/or equivalents thereof, and can include one or more of steps, operations, elements, components, and/or their groups. Unless otherwise defined, all terms (including technical and scientific terms) used herein have the same meaning as commonly understood by one of ordinary skill in the art to which the present teaching belongs. It will be further understood that terms, such as those defined in commonly used dictionaries, should be interpreted as having a meaning that is consistent with their meaning in the context of the present disclosure and relevant art and should not be interpreted in an idealized or overly formal sense unless expressly so defined herein. It will be understood that the description of the present teaching discloses a number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims. In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Advantageous Effects of Invention

According to the present teaching, a leaning vehicle including a lean actuator for leaning a vehicle body can be provided, the leaning vehicle being capable of increasing the degree of freedom in design of the vehicle body.

DESCRIPTION OF EMBODIMENTS

In the following, details of leaning vehicles according to some embodiments of the present teaching will be described with reference to the drawings. The embodiments described below are no more than examples. The present teaching should never be construed in a limited way based on the embodiments described below.

Figure 1:
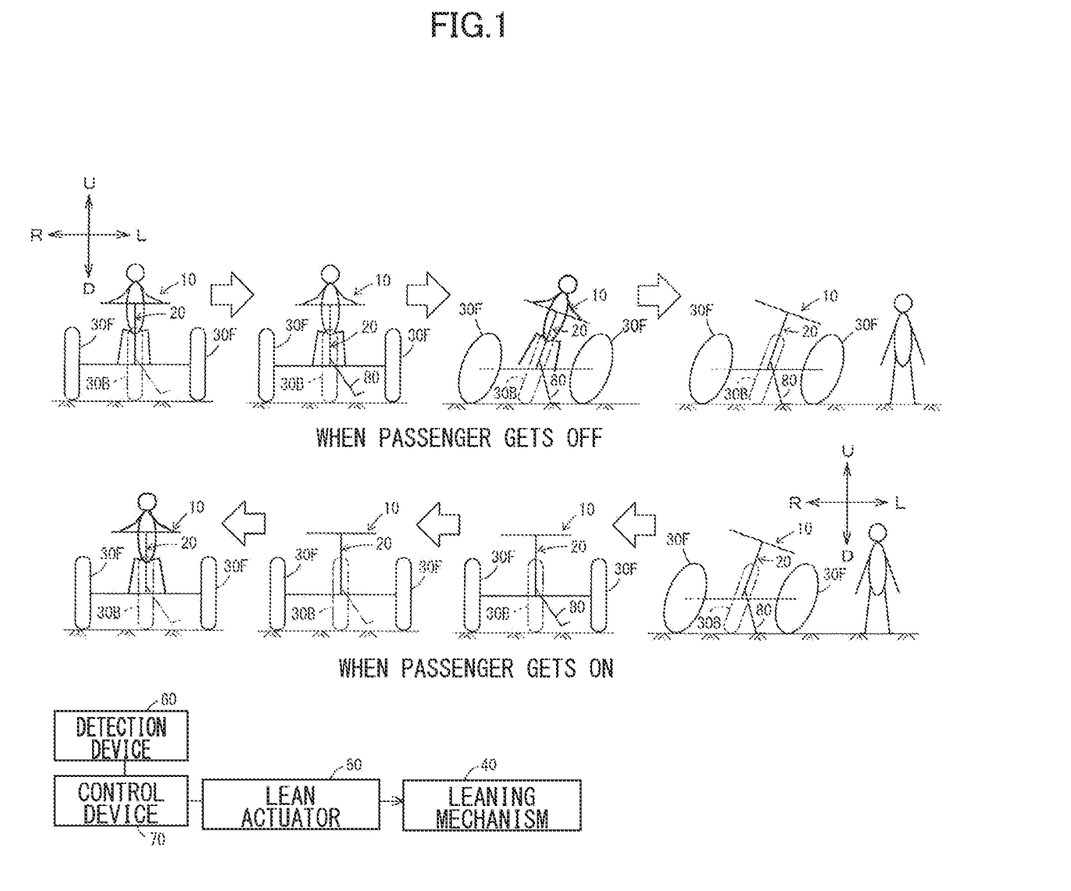
FIG. 1 A diagram containing: a block diagram showing a configuration related to a getting on/getting off control in a leaning vehicle according to a first embodiment of the present teaching; and an illustrative diagram for illustrating the getting on/getting off control FIG. 2 A flowchart showing an example of the getting on/getting off control, which is executed by a control device included in the leaning vehicle shown in FIG. 1

Referring to FIG. 1, a leaning vehicle 10 according to a first embodiment of the present teaching will be described. In this Description, various directions in relation to the leaning vehicle 10 are directions as viewed by a rider sitting on a seat of the leaning vehicle 10. In the leaning vehicle 10, a vehicle body 20 is capable of leaning in a left direction L or a right direction R. When the vehicle body 20 leans in the left direction L or the right direction R, an up-down (upward-downward) direction and a left-right direction of the vehicle body are not coincident with an up-down direction UD and a left-right direction LR of the vehicle. When the vehicle body 20 is upright, the up-down direction and the left-right direction of the vehicle body 20 are coincident with the up-down direction UD and the left-right direction LR of the vehicle.

The leaning vehicle 10 includes the vehicle body 20, two front wheels 30F, one rear wheel 30B, a leaning mechanism 40, a lean actuator 50, a detection device 60, and a control device 70. They will be described below.

The vehicle body 20 includes a vehicle body frame, for example. The two front wheels 30F are supported by the vehicle body 20 respectively. The two front wheels 30F are arranged side by side in the left-right direction LR of the vehicle. The two front wheels 30F are supported by the vehicle body 20 so as to be swingable about an axis extending in the up-down direction of the vehicle body. The rear wheel 30B is supported by the vehicle body 20.

When the leaning vehicle turns in the left direction L, the leaning mechanism 40 causes the vehicle body 20, the front wheels 30F, and the rear wheel 30B to lean in the left direction L. When the leaning vehicle turns in the right direction R, the leaning mechanism 40 causes the vehicle body 20, the front wheels 30F, and the rear wheel 30B to lean in the right direction R.

The lean actuator 50 is connected to the leaning mechanism 40. The lean actuator 50 is, for example, an electric motor having an output member capable of rotating in a clockwise and a counter-clockwise, the output member being mechanically connected to the leaning mechanism 40. The lean actuator 50 imparts a force to a leaning operation of the vehicle body 20, the two front wheels 30F, and the rear wheel 30B.

The detection device 60 detects a getting on/getting off intention input. The getting on/getting off intention input indicates an intention of the rider to get on or get off the leaning vehicle 10.

In an example shown in FIG. 1, in a case where the detection device 60 detects a getting on/getting off intention input indicating an intention of the rider to get on the vehicle, the detection is made while the potential rider is located away from the leaning vehicle 10. In the example shown in FIG. 1, in a case where the detection device 60 detects a getting on/getting off intention input indicating an intention of the rider to get off the vehicle, the detection is made while the rider is in contact with the leaning vehicle 10.

Based on the detection device 60 detecting the getting on/getting off intention input indicating the intention of the rider to get on or get off the vehicle, the control device 70 controls the lean actuator 50 so as to control a lean angle of the vehicle body 20 while the vehicle is not in motion.

The leaning vehicle 10 further includes a device for maintaining a state of the vehicle body 20 while the vehicle is not in motion. To be specific, the leaning vehicle 10 further includes a device for keeping the vehicle body 20 leaning in the left direction L or the right direction R while the vehicle is not in motion. In the example shown in FIG. 1, the leaning vehicle 10 further includes a side stand 80. Changing the state of the side stand 80 from a retracted state to a usable state allows the side stand 80 to keep the vehicle body 20 leaning in the left direction L or the right direction R while the vehicle is not in motion. In the example shown in FIG. 1, the side stand 80 is disposed farther in the left direction than the center of the leaning vehicle 10 with respect to the left-right direction LR. The side stand 80, therefore, keeps the vehicle body 20 leaning in the left direction L while the vehicle is not in motion. The device for maintaining the state of the vehicle body 20 while the vehicle is not in motion may be a device for keeping the vehicle body 20 upright while the vehicle is not in motion.

In a case of controlling the lean actuator 50 so as to increase the lean angle of the vehicle body 20, the control device 70 leans the vehicle body 20 in one of the left direction L or the right direction R in which the side stand 80 is present relative to the center of the leaning vehicle 10 with respect to the left-right direction LR. In the example shown in FIG. 1, the side stand 80 is disposed farther in the left direction than the center of the leaning vehicle 10 with respect to the left-right direction LR. Thus, in the case of controlling the lean actuator 50 so as to increase the lean angle of the vehicle body 20, the control device 70 leans the vehicle body 20 in the left direction L.

Figure 2:
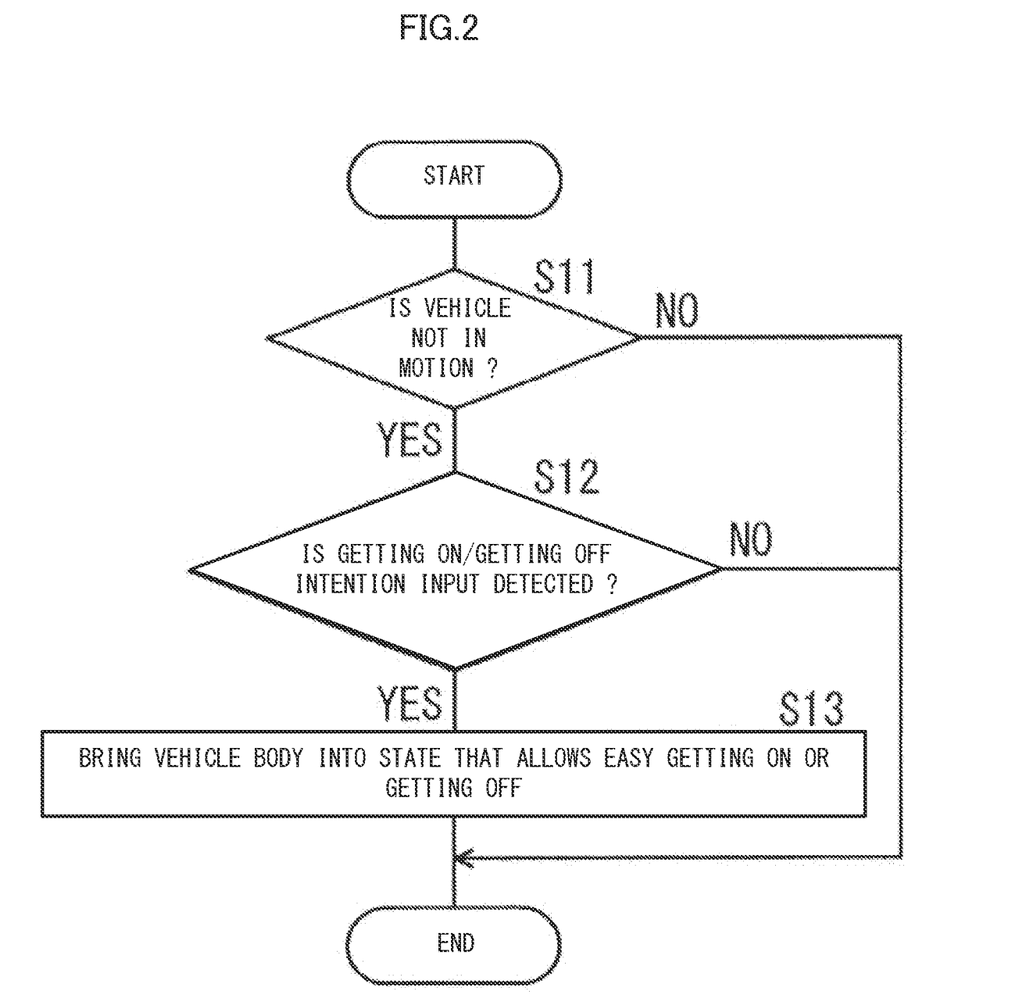

Next, the getting on/getting off control, which is executed by the control device 70, will be described with reference to FIG. 2. First, in step S11, the control device 70 determines whether or not the leaning vehicle 10 is not in motion. The determination of whether or not the leaning vehicle 10 is not in motion may be made based on whether or not the leaning vehicle 10 has been started, or may be made by using a signal from a vehicle speed sensor that detects a vehicle speed of the leaning vehicle 10, for example. In a case where the determination is made based on whether or not the leaning vehicle 10 has been started, the leaning vehicle 10 is determined as being not in motion if the leaning vehicle 10 has not been started. If the leaning vehicle 10 is in motion (step S11: NO), the control device 70 terminates the getting on/getting off control.

If the leaning vehicle 10 is not in motion (step S11: YES), the control device 70 determines whether or not the detection device 60 has detected a getting on/getting off intention input (step S12). In the example shown in FIG. 1, a situation where the detection device 60 detects a getting on/getting off intention input indicating an intention of the rider to get on the vehicle occurs when, for example, the potential rider manipulates a smart key at a location apart from the leaning vehicle 10, and the control device 70 determines whether or not the detection device 60 has detected a signal from the smart key. A situation where the detection device 60 detects a getting on/getting off intention input indicating an intention of the rider to get off the vehicle occurs when, for example, the rider manipulates a smart key while being aboard the leaning vehicle 10, and the control device 70 determines whether or not the detection device 60 has detected a signal from the smart key. Here, it may also be possible that when the rider gets off the vehicle, the control device 70 determines whether or not the detection device 60 has detected a manipulation that the rider made on a device provided in the leaning vehicle 10. If the detection device 60 has not detected a getting on/getting off intention input (step S12: NO), the control device 70 terminates the getting on/getting off control.

If the detection device 60 has detected a getting on/getting off intention input (step S12: YES), the control device 70 brings the vehicle body 20 into a state that allows easy getting on or getting off (step S13). In the example shown in FIG. 1, if the detection device 60 detects a getting on/getting off intention input indicating an intention of the rider to get on the vehicle, the vehicle body 20, which is leaning while the vehicle is not in motion, is raised before the rider gets on the vehicle. If the detection device 60 detects a getting on/getting off intention input indicating an intention of the rider to get off the vehicle, the side stand 80 is shifted from the retracted state into the usable state, and the vehicle body 20 is leaned with the rider being aboard the vehicle. In other words, the vehicle body 20 is leaned before the rider gets off the vehicle. Then, the control device 70 terminates the getting on/getting off control.

For example, it may also be possible that when the detection device 60 detects a getting on/getting off intention input indicating an intention of the rider to get on the vehicle, raising of the vehicle body 20 is preceded by confirmation of sitting-down of the rider with the vehicle body 20 leaning. The sitting-down of the rider is determined based on, for example, a signal from a sensor that detects whether or not the rider is seated on the seat of the leaning vehicle 10. For example, it may also be possible that when the detection device 60 detects a getting on/getting off intention input indicating an intention of the rider to get off the vehicle, leaning of the vehicle body 20 is preceded by confirmation of getting off of the rider with the vehicle body 20 raised (upright state). The getting off of the rider is determined based on, for example, a signal from a sensor that detects whether or not the rider is seated on the seat of the leaning vehicle 10.

In the leaning vehicle 10 having the above-described configuration, the lean angle of the vehicle body 20 can be controlled by the lean actuator 50 both while the vehicle is traveling and while the vehicle is not in motion. It therefore is not necessary that an actuator separate from the lean actuator 50 is used as an actuator for controlling the lean angle of the vehicle body 20 while the vehicle is not in motion. This eliminates the need to prepare a space for installation of the actuator. Consequently, the degree of freedom in design of the vehicle body 20 can be increased.

In the leaning vehicle 10, when the rider has an intention to get on or get off the vehicle, the lean actuator 50 controls the lean angle of the vehicle body 20 while the vehicle is not in motion. This allows the rider to get on or get off the vehicle with an increased ease, by using the lean actuator 50 included in the leaning vehicle 10.

In sum, in the leaning vehicle 10, the lean actuator 50, which is used to lean the vehicle body 20 while the vehicle is traveling, is also used to control the lean angle of the vehicle body 20 while the vehicle is not in motion. Accordingly, both the ease of getting on/getting off the leaning vehicle 10 in accordance with a getting on/getting off intention and the degree of freedom in design of the vehicle body 20 of the leaning vehicle 10 can be increased, without the need to separately provide another lean actuator.

(Variation of First Embodiment)

A leaning vehicle 101 according to a variation of the first embodiment of the present teaching will be described with reference to FIG. 3. The leaning vehicle 101 is different from the leaning vehicle 10 in that it further includes a getting on/getting off intention input device (i.e., an intention input device) 90. The getting on/getting off intention input device 90 is disposed at such a position that a rider can manipulate the getting on/getting off intention input device 90. The getting on/getting off intention input device 90 receives a getting on/getting off intention input indicating an intention of the rider to get on or get off the vehicle. A detection device 60 detects a getting on/getting off intention input that the rider enters to the getting on/getting off intention input device 90.

Figure 3:
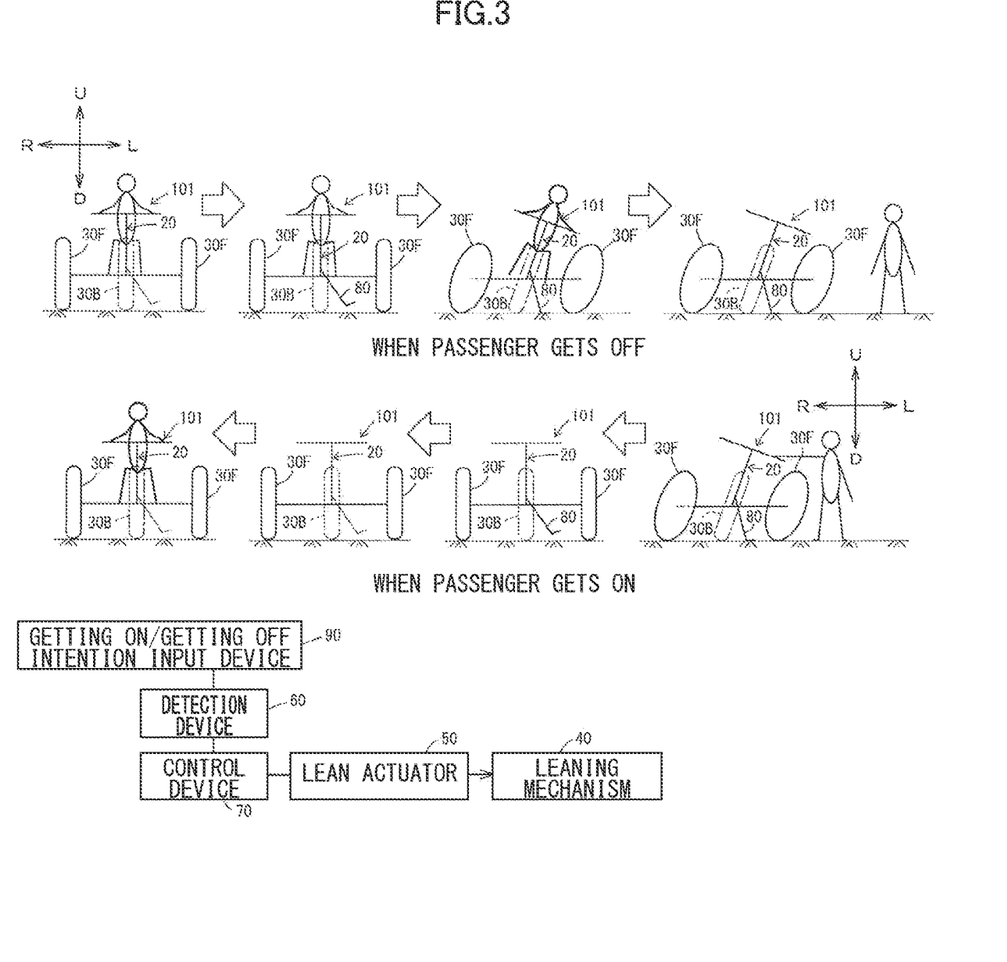
FIG. 3 A diagram containing: a block diagram showing a configuration related to a getting on/getting off control in a leaning vehicle according to a variation of the first embodiment of the present teaching; and an illustrative diagram for illustrating the getting on/getting off control FIG. 4 A diagram containing: a block diagram showing a configuration related to a getting on/getting off control in a leaning vehicle according to a second embodiment of the present teaching; and an illustrative diagram for illustrating the getting on/getting off control FIG. 5 A diagram containing: a block diagram showing a configuration related to a getting on/getting off control in a leaning vehicle according to a variation of the second embodiment of the present teaching; and an illustrative diagram for illustrating the getting on/getting off control

In an example shown in FIG. 3, before the rider gets on the vehicle, the rider enters a getting on/getting off intention input indicating an intention to get on the vehicle to the getting on/getting off intention input device 90, and after a vehicle body 20 is raised, the rider gets on the vehicle. Alternatively, in a case where the rider enters a getting on/getting off intention input indicating an intention to get on the vehicle to the getting on/getting off intention input device 90 before the rider gets on the vehicle, raising of the vehicle body 20 may be preceded by confirmation of sitting-down of the rider with the vehicle body 20 leaning, for example. In the example shown in FIG. 3, before the rider gets off the vehicle, the rider enters a getting on/getting off intention input indicating an intention to get off the vehicle to the getting on/getting off intention input device 90, and after the vehicle body 20 is leaned, the rider gets off the vehicle. Alternatively, in a case where the rider enters a getting on/getting off intention input indicating an intention to get off the vehicle to the getting on/getting off intention input device 90 before the rider gets off the vehicle, leaning of the vehicle body 20 may be preceded by confirmation of getting off of the rider with the vehicle body 20 raised (upright state), for example.

The leaning vehicle 101 having such a configuration can provide the same effects as those of the leaning vehicle 10.

Second Embodiment

Figure 4:
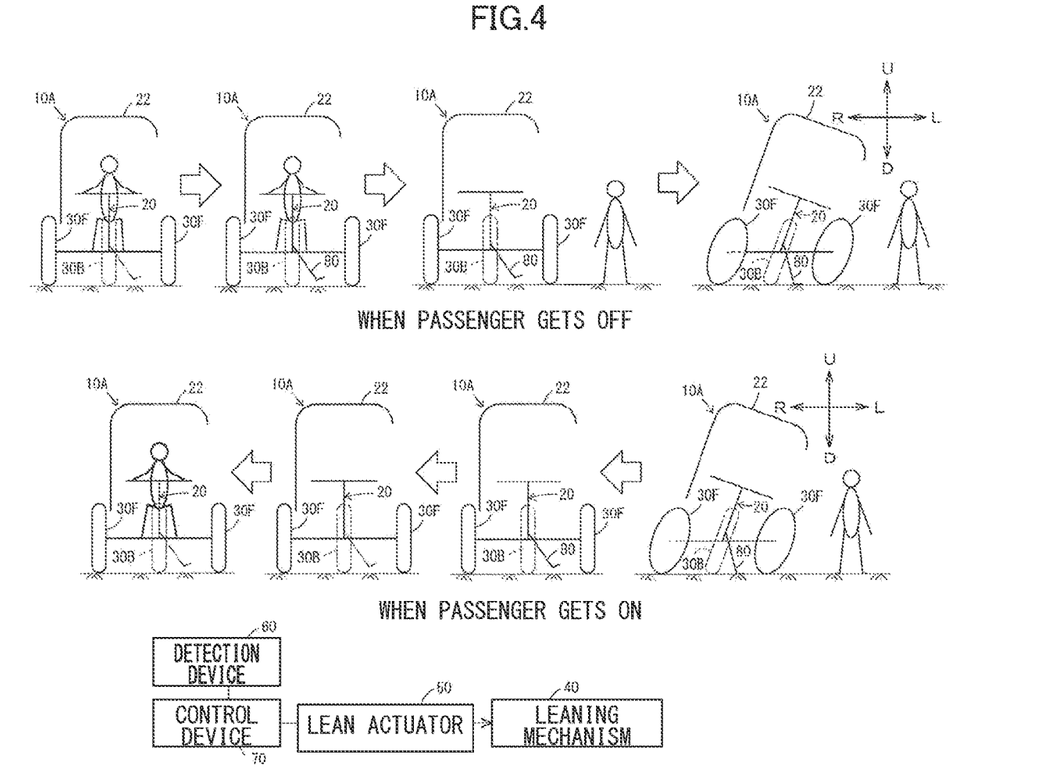

A leaning vehicle 10A according to a second embodiment of the present teaching will be described with reference to FIG. 4. The leaning vehicle 10A is different from the leaning vehicle 10 in that it includes a roof 22. The roof 22 is at least partially disposed above a rider who is aboard the leaning vehicle 10A.

In the leaning vehicle 10A having the roof 22, it is difficult to get on or get off the vehicle while a vehicle body 20 is leaning. In the leaning vehicle 10A, therefore, to allow the rider to easily get on the vehicle, a control device 70 controls a lean actuator 50 such that the vehicle body 20, which is leaning while the vehicle is not in motion, is raised. In the leaning vehicle 10A, moreover, to allow the rider to easily get off the vehicle, the control device 70 controls the lean actuator 50 such that after the rider gets off the vehicle with the vehicle body 20 raised, the vehicle body 20 leans and then the vehicle body 20 is kept leaning.

The leaning vehicle 10A having such a configuration can provide the same effects as those of the leaning vehicle 10.

(Variation of Second Embodiment)

Figure 5:
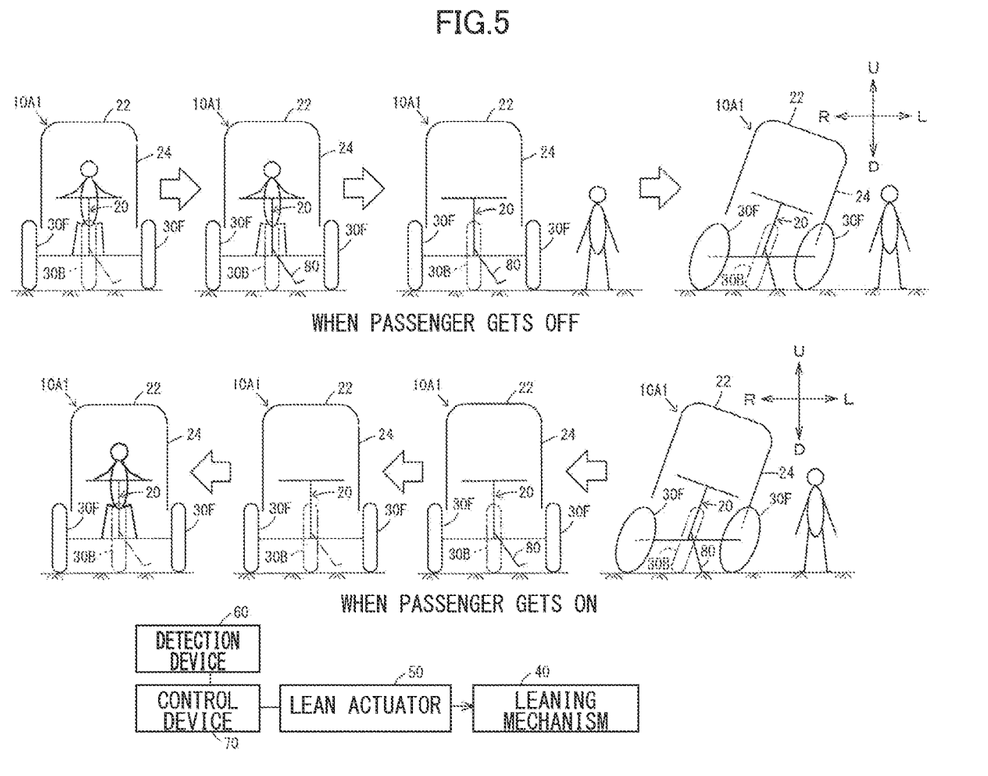

A leaning vehicle 10A1 according to a variation of the second embodiment of the present teaching will be described with reference to FIG. 5. The leaning vehicle 10A1 is different from the leaning vehicle 10A in that it includes a door 24. The door 24 is opened or closed when a rider of the leaning vehicle 10A1 gets on or gets off the vehicle.

The leaning vehicle 10A1 having such a configuration can provide the same effects as those of the leaning vehicle 10A.

Other Embodiments

The embodiments and variations, of which at least either one of description or illustration has been given herein, are for ease of understanding the present disclosure, and not for limiting the concept of the present disclosure. The foregoing embodiments and variations may be altered and/or adapted without departing from the spirit of the present disclosure. The spirit encompasses equivalent elements, modifications, omissions, combinations (for example, a combination of a feature of any embodiment and a feature of any variation), adaptations and/or alterations as would be appreciated by those skilled in the art based on the embodiments disclosed herein. The limitations in Claims are to be interpreted broadly based on the language employed in Claims and not limited to embodiments and variations described herein or during the prosecution of the present application. The embodiments and variations are to be construed as non-exclusive. For example, in this Description, the terms "preferably", "may", and "possible" are non-exclusive and mean "preferably, but not limited to", "may, but not limited to", and "possibly, but not limited to", respectively.

For example, in the first embodiment and the variation of the first embodiment, getting on or off the vehicle while the vehicle body 20 is leaning may sometimes be easier for the rider. In such a case, the vehicle body 20 is leaned at a time of getting on or getting off.

For example, in a case where the leaning vehicle 10A1 according to the variation of the second embodiment is not in motion on a slope with the up-down direction of the vehicle body 20 being coincident with the vertical direction, the door 24 may sometimes interfere with the slope when the door 24 is opened. In such a case, leaning of the vehicle body 20 may be controlled such that the interference of the door 24 with the slope can be suppressed.

For example, an aspect in which the lean actuator controls the lean angle of the vehicle body while the vehicle is not in motion encompasses an aspect in which the lean angle of the vehicle body remains unchanged before and after the detection device detects a getting on/getting off intention input. For example, a configuration may be possible in which before detection of a getting on intention input as the getting on/getting off intention input indicating an intention of the rider to get on the vehicle, the vehicle body is maintained at a predetermined lean angle with a support stand or the like, and after the detection of the getting on intention input, the support stand ceases to function, and is replaced by the lean actuator maintaining the state of the lean angle of the vehicle body as it has been.

REFERENCE SIGNS LIST 10 leaning vehicle
20 vehicle body
22 roof
24 door
30F front wheel
30B rear wheel
40 leaning mechanism
50 lean actuator
60 detection device
70 control device
90 getting on/getting off intention input device

The invention claimed is:

1. A leaning vehicle comprising:
a vehicle body;
at least one front wheel and at least one rear wheel, which are supported by the vehicle body and include
one front wheel and two rear wheels, or
two front wheels and one or two rear wheels;
a leaning mechanism that causes the vehicle body, the at least one front wheel, and the at least one rear wheel
to lean in a left direction when the leaning vehicle turns in the left direction, and
to lean in a right direction when the leaning vehicle turns in the right direction;
a lean actuator connected to the leaning mechanism, the lean actuator being configured to impart a force to a leaning operation of the vehicle body, the at least one front wheel, and the at least one rear wheel;
a side stand configured to maintain the vehicle body of the leaning vehicle at a predetermined lean angle when the leaning vehicle is not in motion;
a detection device that detects a getting on intention input, which indicates that a rider of the leaning vehicle intends to get on the leaning vehicle; and
a control device configured to control the lean actuator to thereby
control a lean angle of the vehicle body while the vehicle body is in motion, based on a manipulation that the rider performs for turning in the left direction or the right direction, and
control the lean angle of the vehicle body while the leaning vehicle is not in motion, based on a detection result of the detection device, by
before detecting the getting on intention input, maintaining the vehicle body at the predetermined lean angle by the side stand, and
while the vehicle is not in motion, upon detecting the getting on intention input, controlling the lean actuator to thereby raise the vehicle body before the rider gets on the leaning vehicle, based on the getting on intention input detected by the detection device.

2. The leaning vehicle according to claim 1, wherein the detection device detects the getting on intention input from the rider, when the rider is away from the leaning vehicle.

3. The leaning vehicle according to claim 2, wherein the getting on intention input includes at least one of an image, a voice, a radio wave or a sound wave.

4. The leaning vehicle according to claim 1, further comprising an intention input device that receives the getting on intention input indicating an intention of the rider to get on the leaning vehicle, the intention input device being disposed at a position to be manipulatable by the rider, wherein
the detection device detects the getting on intention input that the rider enters to the intention input device.

5. A leaning vehicle comprising:
a vehicle body;
at least one front wheel and at least one rear wheel, which are supported by the vehicle body and include
one front wheel and two rear wheels, or
two front wheels and one or two rear wheels;
a leaning mechanism that causes the vehicle body, the at least one front wheel, and the at least one rear wheel
to lean in a left direction when the leaning vehicle turns in the left direction, and
to lean in a right direction when the leaning vehicle turns in the right direction;
a lean actuator connected to the leaning mechanism, the lean actuator being configured to impart a force to a leaning operation of the vehicle body, the at least one front wheel, and the at least one rear wheel;
a side stand configured to maintain the vehicle body of the leaning vehicle at a predetermined lean angle when the leaning vehicle is not in motion;
a detection device that detects a getting off intention input, which indicates that the rider intends to get off the leaning vehicle; and
a control device configured to control the lean actuator to thereby
control a lean angle of the vehicle body while the vehicle body is in motion, based on a manipulation that the rider performs for turning in the left direction or the right direction, and
control the lean angle of the vehicle body while the leaning vehicle is not in motion, based on a detection result of the detection device, wherein
the leaning vehicle is configured to have a roof installable thereon,
if the roof is installed and is at least partially above the rider of the leaning vehicle, the control device is configured to control the lean actuator to thereby lean the vehicle body after the rider gets off the leaning vehicle, in response to the getting off intention input detected by the detection device while the rider is on the leaning vehicle, and
if the leaning vehicle does not have the roof installed thereon, the control device is configured to control the lean actuator to thereby lean the vehicle body before the rider gets off the leaning vehicle, in response to the getting off intention input detected by the detection device while the rider is on the leaning vehicle.

6. The leaning vehicle according to claim 5, further comprising an intention input device that receives the getting off intention input indicating an intention of the rider to get off the leaning vehicle, the intention input device being disposed at a position to be manipulatable by the rider, wherein
the detection device detects the getting off intention input that the rider enters to the intention input device.

7. The leaning vehicle according to claim 5, wherein the control device is further configured to control the lean actuator to thereby lean the vehicle body while the vehicle is not in motion, including, if the leaning vehicle has the roof installed thereon, to keep the lean angle of the vehicle body after the rider gets off the leaning vehicle.

* * * * *